United States Patent [19]

Linke et al.

[11] Patent Number: 4,920,926
[45] Date of Patent: May 1, 1990

[54] WASTE HEAT BOILER FOR COOLING OF PARTIAL OXIDATION CRUDE GAS

[75] Inventors: Adolf Linke, Essen; Karl-Heinz Dutz, Herten; Hans Niermann, Essen; Gerhard Wilmer, Hattingen, all of Fed. Rep. of Germany

[73] Assignee: Krupp Koppers GmbH, Essen, Fed. Rep. of Germany

[21] Appl. No.: 265,596

[22] Filed: Nov. 1, 1988

[30] Foreign Application Priority Data

Apr. 11, 1987 [DE] Fed. Rep. of Germany ....... 3737359

[51] Int. Cl.$^5$ .................... F22B 37/18; F22B 37/48
[52] U.S. Cl. ................................ 122/379; 122/7 R; 122/392; 165/84; 165/95; 165/163
[58] Field of Search ............ 122/7 R, 7 A-D, 122/247, 392, 379; 165/84, 95, 157, 159, 163

[56] References Cited

U.S. PATENT DOCUMENTS 4,478,608 10/1984 Dorling et al. ............ 122/7 R X
4,602,677 7/1986 Forster et al. ............ 122/392 X Primary Examiner—Edward G. Favors
Attorney, Agent, or Firm—Michael J. Striker

[57] ABSTRACT

A waste heat boiler for cooling partial oxidation crude gas comprises a pressure container, a crude gas-clean gas heat exchanger in the container, a tubular body formed as a tubular basket and arranged in the pressure container, the crude gas-clean gas heat exchanger being arranged inside the tubular basket, and heating surfaces associated with the crude gas-clean gas heat exchanger.

9 Claims, 1 Drawing Sheet

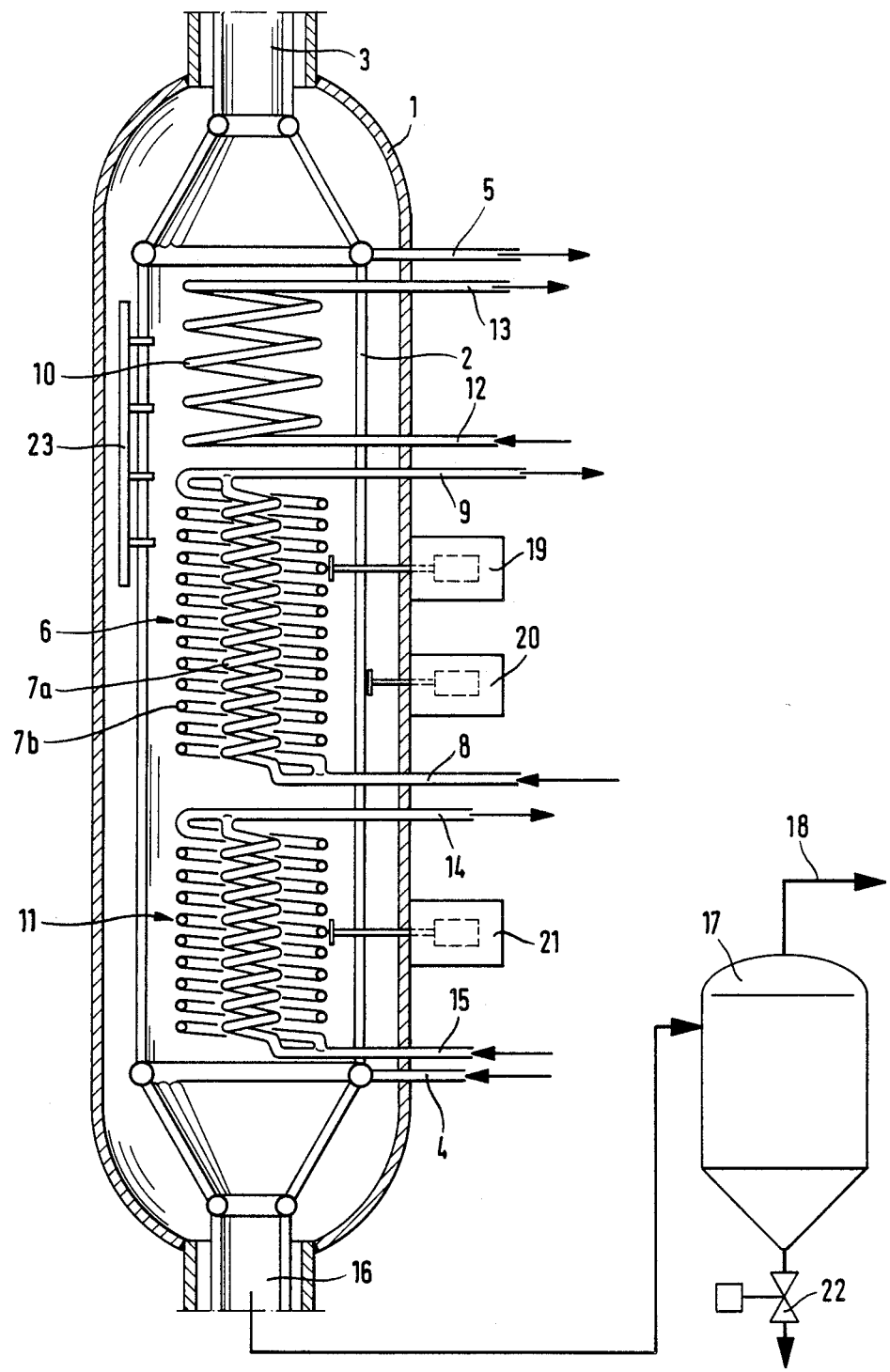

WASTE HEAT BOILER FOR COOLING OF PARTIAL OXIDATION CRUDE GAS

BACKGROUND OF THE INVENTION

The present invention relates to a waste heat boiler for cooling partial oxidation crude gas with an integrated crude gas-clean gas heat exchanger.

The German document DE-OS No. 3,505,157 discloses a process of generation of electrical energy in a combined gas and steam turbine power unit with a preconnected coal gasifying device. In this system the dedusted and desulfurized clean gas before its introduction into a combustion engine of a gas turbine, is preheated in an indirect heat exchange with the hot partial oxidation crude gas to a temperature 200°–500° C. This heat exchange must be performed in a crude-clean gas heat exchanger with heat exchanging surfaces which are integrated in the waste heat boiler of the coal gasifying device.

With these process steps a maximum portion of the tangible heat of the hot partial oxidation crude gas which is discharged from the coal gasifying device must be transferred to the cold dedusted and desulfurized clean gas which is supplied to the combustion chamber of the gas turbine. On the other hand, by the arrangement of the crude gas-clean gas heat exchanger inside the waste heat boiler, it is possible better than with the conventional heat exchanger to eliminate incrustations and dirt on the crude gas side of heat exchanger surfaces. The above mentioned reference does not disclose however any details of the construction of such a waste heat boiler with an integrated crude gas-clean gas heat exchanger.

SUMMARY OF THE INVENTION

Accordingly, it is an object of the present invention to provide a waste heat boiler which has an advantageous construction for performing the above specified method.

In keeping with these objects and with others which will become apparent hereinafter, one feature of the present invention resides, briefly stated, in a waste heat boiler in which a pressure container provided with a crude gas-clean gas heat exchanger also has a tubular body which is formed as a tubular basket located inside the pressure container, and the crude gas-clean gas heat exchanger is arranged inside the tubular basket, and also heating surfaces are associated with the heat exchanger.

In accordance with another advantageous feature of the present invention the crude gas-clean gas heat exchanger includes one or several tubularly wound tubular coils through which the clean gas flows. It is to be understood that also other construction of the crude gas-clean gas heat exchanger are possible, for example a plate heat exchanger.

The multi-path heating surfaces can be arranged in accordance with the present invention so that they are located before or upstream of the crude gas-clean gas heat exchanger, or after or downstream of the latter, depending on required operational conditions.

For proper functioning of the inventive waste heat boiler it is important that it is supplied in a normal case with cleaning devices which can remove the dirt from the heat exchanger for tubular surfaces also during the operation of the waste heat boiler.

It is especially advantageous in accordance with a further feature of the present invention when between the pressure container and the tubular basket one or several wall-integrated soot blowers are arranged. It is further advantageous when inside of the pressure container a plurality of mechanical cleaning devices are arranged to act on the tubular basket, the crude gas-clean gas heat exchanger, and the heating surfaces. The cleaning devices can be formed as knocking devices.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view which schematically shows the waste heat boiler in accordance with the present invention.

DESCRIPTION OF A PREFERRED EMBODIMENT

The waste heat boiler in accordance with the present invention is shown schematically, so that only its important parts are illustrated without additional structural details which are conventional for an expert.

The waste boiler in accordance with the present invention includes a pressure container identified with reference numeral 1 and a tubular body which is formed as a tubular basket 2 and serves for producing a waste heat steam. The pressure container 1 is designed so that it withstands the gasification pressure which acts in it. A partial oxidation crude gas which comes from a not shown coal gasifier flows with a respective pressure from above into the pressure container 1 through a pipe 3. The gasifier can be provided with an integrated waste heat boiler-radiation part. The supply of a feed water to the tubular basket 2 is performed through a conduit 4. Water steam which is produced during cooling of the partial oxidation crude gas is withdrawn from the tubular basket 2 through a conduit 5.

A crude gas-clean gas heat exchanger 6 is arranged inside the tubular basket 2. In the shown embodiment it includes two tubularly wound tubular coils 7a and 7b. The clean gas flows through the tubular coils 7a and 7b and the coils are connected with one another for providing a throughflow so that the dedusted desulfurized cold clean gas is introduced through a conduit 8 into the tubular coils, flows through the tubular coils, and finally is withdrawn in a hot condition through a conduit 9. In the shown embodiment the flowing hot partial oxidation crude gas flows through the tubular coils 7a and 7b at both sides from above downwardly, so that an especially intensive heat exchange between the crude gas and the clean gas is performed which depending on the crude gas temperature leads to an increase of the clean gas temperature approximately to 300°–500° C.

In this case heating surfaces 10 and 11 are arranged above and below the crude gas-clean gas heat exchanger 6. With the heating surfaces 10 and 11, the available tangible heat of the partial oxidation crude gas can be additionally used, for example for generation of saturated steam. The required supply of feed or boiler water is performed through conduits 12 and 15, while the withdrawal of the saturated steam is performed through conduits 13 and 14.

As mentioned hereinabove, the arrangement and the number of the above described heating surfaces, and also their design is selected in accordance with the required operational conditions of the waste heat boiler.

The cooled partial oxidation crude gas is discharged from the waste heat boiler downwardly through a pipe 16 and supplied to a cyclone 17 for dust separation. Then the cooled and dedusted gas is withdrawn through a conduit 18 and supplied for its further treatment.

In the upper part of the waste heat boiler a wall-integrated soot blower 23 is arranged between the pressure container 1 and the tubular basket 2. The soot blower 23 can be of a construction which is described in the German document DE-OS No. 3,312,599. Furthermore, in the region of the crude gas-clean gas heat exchanger 6, as well as the lower heating surfaces 11, mechanical cleaning devices 19, 20 and 21 are arranged. In the shown embodiment they are formed as knocking devices. The cleaning device 19 acts on the crude gas-clean gas heat exchanger 6, the cleaning device 20 acts on the tubular basket 2, and the cleaning device 21 acts on the lower heating surfaces 11.

It is to be understood that the arrangement and the number of the wall-integrated soot blowers 23 as well as of the mechanical cleaning devices 19–21 can be adjusted to respective requirements of the practice, so that their arrangement can deviate from the arrangement shown in the drawing. What is decisive in connection with this is that all products which are removed inside the waste heat boiler during cleaning are withdrawn from the system through a single device. In the present case it is a cyclone 17, in which the products of cleaning together with the solid matter contained in the gas are separated and can be discharged through a valve or sluice device 22.

It will be understood that each of the elements described above, or two or more together, may also find a useful application in other types of constructions differing from the types described above.

While the invention has been illustrated and described as embodied in a waste heat boiler for cooling partial oxidation crude gas, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A waste heat boiler for cooling partial oxidation crude gas, comprising a pressure container a crude gas-clean gas heat exchanger extending in said container in a predetermined direction for using tangible heat of the partial oxidation crude gas generated during cooling thereof; a tubular body formed as a tubular basket and arranged in said pressure container, said crude gas-clean gas heat exchanger being arranged inside said tubular basket; and heat exchanging surfaces associated with said crude gas-clean gas heat exchanger and arranged at both sides of said heat exchanger as considered in said direction in a spaced relationship relative to said heat exchanger for additionally using the tangible heat of the partial oxidation crude gas.

2. A waste heat boiler as defined in claim 1, wherein said crude gas-clean gas heat exchanger includes at least one tubularly wound tubular coil through which clean gas flows.

3. A waste heat boiler as defined in claim 1, wherein said crude gas-clean gas heat exchanger includes a plurality of tubularly wound coils through which clean gas flows.

4. A waste heat boiler as defined in claim 1, wherein said heating surfaces are arranged upstream of said crude gas-clean gas heat exchanger.

5. A waste heat boiler as defined in claim 1, wherein said heating surfaces are arranged downstream of said crude gas-clean gas heat exchanger.

6. A waste heat boiler as defined in claim 1, wherein said heating surfaces are arranged upstream and downstream of said crude gas-clean gas heat exchanger.

7. A waste heat boiler as defined in claim 1; and further comprising at least one soot blower arranged between said pressure container and said tubular basket.

8. A waste heat boiler as defined in claim 1; and further comprising a plurality of soot blowers arranged between said pressure container and said tubular basket.

9. A waste heat boiler as defined in claim 1; and further comprising a plurality of mechanical cleaning devices arranged inside said pressure container and acting upon said tubular basket, said crude gas-clean gas heat exchanger, and said heating surfaces.

* * * * *